United States Patent [19]

Knop

[11] 4,255,019
[45] Mar. 10, 1981

[54] DIFFRACTIVE COLOR FILTER

[75] Inventor: Karl H. Knop, Zurich, Switzerland

[73] Assignee: RCA Corporation, New York, N.Y.

[21] Appl. No.: 28,368

[22] Filed: Apr. 9, 1979

[51] Int. Cl.³ ............................................. G02B 27/46
[52] U.S. Cl. .............................. 350/162 SF; 350/167;
350/162 R
[58] Field of Search ............. 350/162 SF, 162 R, 314,
350/167

[56] References Cited

U.S. PATENT DOCUMENTS

| | | | |
|---|---|---|---|
| 2,733,291 | 1/1956 | Kell | 178/5.4 |
| 3,264,164 | 8/1966 | Jerothe et al. | 350/167 |
| 3,582,984 | 6/1971 | Kurokawa | 350/167 |
| 3,834,785 | 9/1974 | Kimura | 350/162 SF |
| 3,940,788 | 2/1976 | Abe | 350/162 SF X |
| 3,957,354 | 5/1976 | Knop | 350/162 SF |
| 4,079,411 | 3/1978 | Engelbrecht et al. | 350/162 R X |
| 4,130,347 | 12/1978 | Knop | 350/162 R |

OTHER PUBLICATIONS

Rogers, G. L., "Non-Coherent Optical Processing", *Optics and Laser Technology*, Aug. 1975, p. 153, Aug. '75.

Primary Examiner—John K. Corbin
Assistant Examiner—Bruce Y. Arnold
Attorney, Agent, or Firm—Samuel Cohen; George J. Seligsohn

[57] ABSTRACT

A diffractive color filter, comprised of proximately disposed diffraction grating and lenticular lens structures, which may be embossed on plastic sheet, cooperates with an imaging lens to produce color stripes or color spots of an image on a photosensitive surface. The diffractive color filter may be used, for example, as a color-encoding stripe filter of a color TV camera.

13 Claims, 5 Drawing Figures

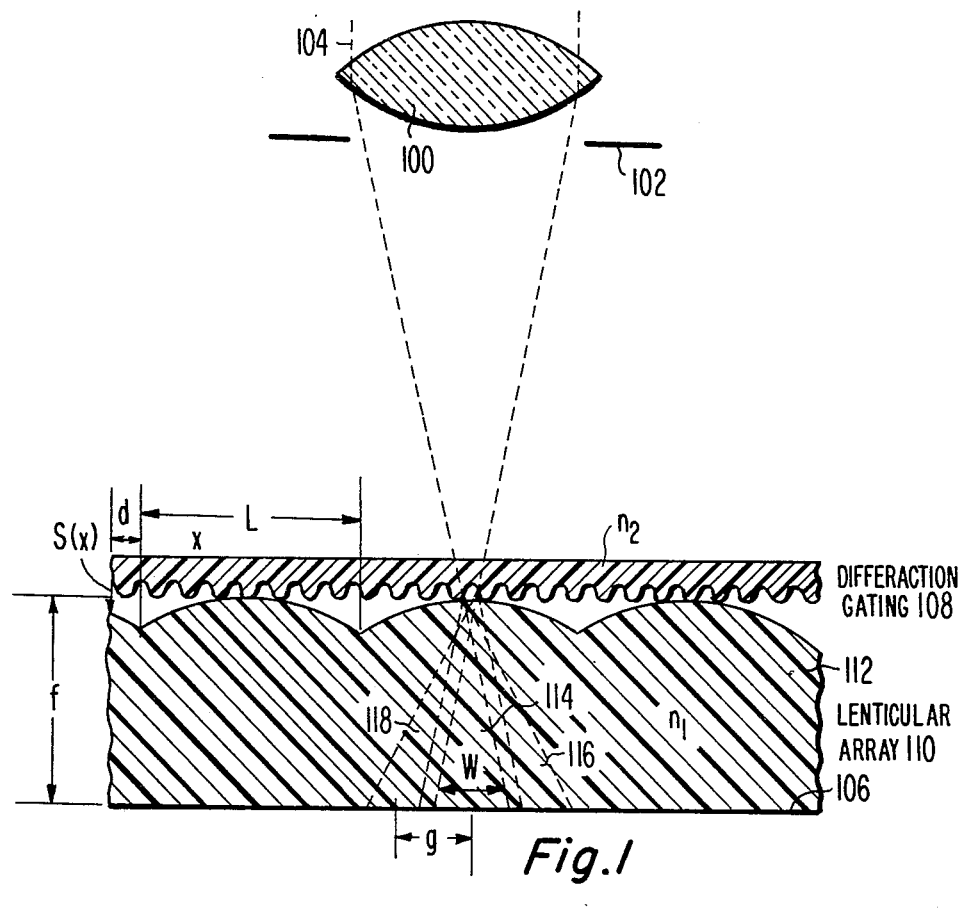
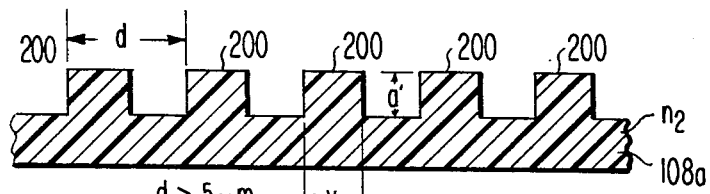
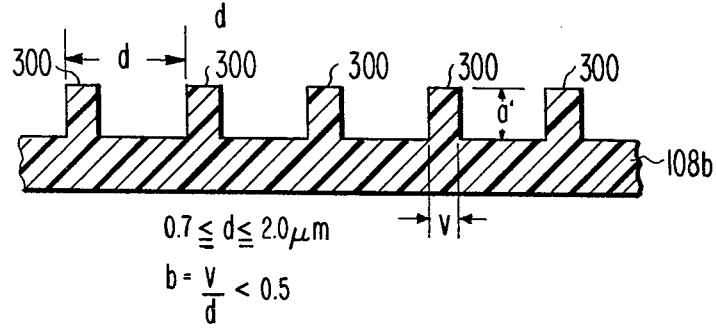

DIFFRACTIVE COLOR FILTER

This invention relates to color filters and, more particularly, to a diffractive color filter for use in a polychromatic-light imaging system including an imaging lens and a photosensitive surface situated in an image plane of the lens.

Color filters are used, inter alia, in color photography and in color television cameras. Usually color filters are composed of absorptive color dyes or dichroic mirrors. More recently, diffractive color filters have been developed. Examples of diffractive color filters are disclosed in U.S. Pat. No. 3,957,354, which issued to me on May 18, 1976; U.S. Pat. No. 4,079,411, which issued to Englebrecht and me on Mar. 14, 1978, and U.S. Pat. No. 4,130,347, which issued to me on Dec. 19, 1978.

Relatively expensive color television cameras, comprising at least three pick-up tubes, are usually employed for television broadcast purposes. However, a less expensive, single pick-up tube color television camera, developed by Kell, is disclosed in U.S. Pat. No. 2,733,291, which issued Jan. 31, 1956. This single pick-up tube color television camera employs an optical system including a spatial filter and an absorptive-dye color-encoding stripe filter for illuminating the photosensitive surface of the single pick-up tube with an image of an object which is illuminated with polychromatic (e.g. white) light. The color filter includes at least two sets of color stripes, each set corresponding to a different primary color. The spatial arrangement for each set of color stripes with respect to the scanning direction of the pick-up tube electron beam is such as to generate separate color modulated carriers for each color, in addition to a luminance signal. Spatial harmonics and intermodulation components of the fundamental spatial frequencies of the color stripe filter tend to produce undesirable color shading, moire patterns and color beats. The spatial filter of the pick-up tube optical system operates as a low-pass filter for minimizing these undesired effects of the absorptive-dye color stripe filter.

The prior art today still employs essentially that same absorptive-dye color-encoding stripe filter as disclosed in Kell in single pick-up tube television cameras. However, the structure of the spatial filter employed with color-encoding stripe filters has improved with time. For example, U.S. Pat. No. 3,940,788, which issued to Abe et al. on Feb. 24, 1976, discloses a spatial filter for a single pick-up tube color camera which is comprised of a phase grating and a lenticular lens, which are oriented relative to each other and to a conventional absorptive-dye color-encoding stripe filter to minimize color shading, moire patterns and color beats.

The present invention does away completely with the need for an absorptive-dye color filter of any type, as well as a separate spatial filter, in the optical system of a single pick-up tube color television camera. Instead, the present invention is directed to a diffractive color filter in which the color filter itself (not a spatial filter used in conjunction with an absorptive-dye color-encoding filter) is comprised of a lenticular lens array and a phase grating. More specifically, the present invention is directed to a diffractive color filter for use in a polychromatic-light imaging system including an imaging lens and a photosensitive surface situated in an image plane of the lens. The lens has an f-number $F_c$ greater than or equal to that of a minimum f-number $F_c^{min}$. The filter itself comprises a lenticular lens array composed of a material exhibiting an index of refraction $n_1$. The array has a lens periodicity L and a focal length f in the material with index of refraction $n_1$ thereby to provide an f-number $F_L$ for the array equal to $f/n_1L$. Further, the array is adapted to be situated with its focal plane substantially in coincidence with the photosensitive surface. The color filter also includes a diffractive structure situated substantially in proximity to the array. The diffractive structure is composed of a material exhibiting an index of refraction $n_2$. Further, the diffractive structure includes a phase grating having a predetermined grating profile S(x) and grating line spacing d, where d is larger than a certain wavelength $\gamma$ of the polychromatic light. Finally, the following relationships exist among the above-defined parameters of the diffractive color filter and the polychromatic-light imaging system for which it is designed:

$$F_c^{min} \geq d/\gamma \qquad (1)$$

$$F_L = d/K\gamma, \qquad (2)$$

where K is a plural integer.

In the drawings:

FIG. 1 is a schematic diagram of an embodiment of the diffractive color filter of the present invention;

FIG. 2 illustrates a square-wave transmissive phase grating having an aspect ratio of one-half;

FIG. 3 illustrates a rectangular transmissive phase grating having an aspect ratio of less than one-half.

Figure 4A:
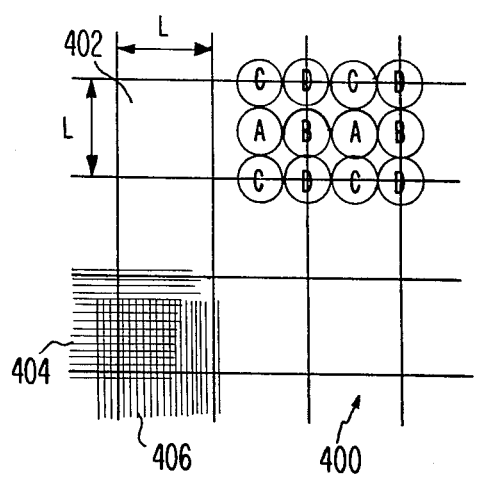
FIGS. 4a and 4b illustrate respective embodiments of a two-dimensional diffractive color filter employing the principles of the present invention.

Referring to FIG. 1, there is shown an imaging system including imaging lens 100 having an effective aperture defined by diaphram 102. A beam of polychromatic (e.g. white) light 104 from an illuminated object (not shown) is imaged by imaging lens 100 on a photosensitive surface 106 situated in an image plane of lens 100. By way of example, photosensitive surface 106 may be photo-chemical (e.g. photoemulsion or photoresist), photoelectric (e.g. photo-cathode of a vidicon), photovoltaic or photo-conductive. In any case, the response of each elemental area of photosensitive surface 106 is in accordance with the intensity of light impinging on that elemental area. Diffraction grating 108 and lenticular array 110 of cylindrical lenses 112 comprise an embodiment of the diffractive color filter of the present invention. Lenticular array 110 may comprise a transparent plastic exhibiting an index of refraction $n_1$ having lenticular lenses 112 formed (for example by hot pressing) on the upper surface thereof. The periodicity of lenses 112 of lenticular array 110 is L, and lenticular array 110 has a thickness f equal to the focal length of each lens 112. The lower surface of lenticular array 110 is substantially in coincidence with photosensitive surface 106. Thus, photo-sensitive surface 106 coincides with the focal plane of lenticular array 110. Diffraction grating 108 is a phase grating, which may comprise a surface relief pattern embossed in the lower surface of a transparent plastic sheet exhibiting an index of refraction $n_2$. The indices of refraction $n_1$ and $n_2$ may be the same as each other or, alternatively, they may be different from each other. Diffraction grating 108 has a line spacing d which is large relative to the wavelength $\gamma$ of polychromatic light 104, but which is small relative to the lens period L of lenticular array 110. Each diffraction period of grating 108 has the same certain predetermined waveform profile S(x).

The optical layout as shown in FIG. 1 may be modified in various ways while still representing the same idea. For instance, one may prefer to choose a lenticular array with a thickness smaller than its focal length. The focal plane still would coincide with the image plane and the photosensitive surface. The formulas have to be modified to take into account that only a portion of the optical paths for each of various light order (e.g. 114, 116 and 118) would still be within a medium having an index of refraction $n_1$, while the remainder of the optical paths would be in air having an index of refraction of unity. Also, one could interchange the relative position of lenticular array and grating, or even incorporate them in a single surface.

The effect of diffraction grating 108 on light beam 104, which is incident on diffraction grating 108 after passing through imaging lens 100, is to diffract the light entering every respective lens 112 of array 100 into a zero diffraction order, such as zero diffraction order 114, and higher diffraction orders, such as positive first diffraction order 116 and negative first diffraction order 118. In FIG. 1, the width of any diffraction order, such as zero diffraction order 114, impinging on photo-sensitive surface 106 is W. Further, the distance between the respective centers of two adjacent diffraction orders, such as the distance between either first diffraction order 116 or 118 and zero diffraction order 114 on photo-sensitive surface 106 is g. In order to prevent overlapping of the respective zero order image and each of the higher order images, it is required that $W \leq g$.

If the f-number of imaging lens 100 is $F_c$, the following relationship holds:

$$W = f/F_c n_1 \quad (3)$$

However, in accordance with diffraction theory, it can be shown that $$g = f\gamma/n_1 d \quad (4)$$

Therefore, combining equations (3) and (4), $W \leq g$ so long as $F_c \geq F_c^{min}$, such that $F_c^{min} \geq d/\gamma$ (as set forth in equation (1) above).

The diffraction pattern generated by each single lens 112 of lenticular array 110 repeats after a distance L, so that different diffraction orders from separate ones of lenses 112 are superimposed on each other. More specifically, the Kth diffraction order (where K is some particular plural integer) of each individual lenticular lens 112 will fall on the zero diffraction order of its neighboring lenticular lens. More quantitatively, $$Kg = L \quad (5)$$

However, (assuming the lower surface of lenticular array 110 extends to its focal plane, as shown in FIG. 1) the f-number $F_L$ of lenticular array 110 is defined as $$F_L = f/n_1 L \quad (6)$$

Substituting equations (4) and (5) in equation (6) produces equation (2) above, namely, $$F_L = d/K\gamma \quad (2)$$

Should the lower surface of lenticular array not extend all the way to its focal plane, the effective f-number $F_L$ would still be proportional to f/L, but the constant of proportionality would be more complex than $1/n_1$. Specifically, the effective constant of proportionality would have to be computed by means of the law of refraction, taking into consideration that a portion of the optical path of the various diffraction orders (e.g. 114, 116 and 118) has an index of refraction $1/n_1$ and the remainder has a different index of refraction, such as unity for air.

A lenticular array of cylindrical lenses causes a color pattern, generated in the focal plane of lenticular array 110 on photosensitive surface 106, to consist of various juxtaposed color stripes. In general, the color stripes are divided into repeating groups of stripes, with each group comprising K different color stripes. However, in the special case where the diffraction grating profile is symmetric (i.e. $S(x) = S(-x)$), each repeating group of stripes is only composed of (1 + integral part of K/2) different color stripes.

The color of each respective stripe is determined by the optical transmittance of the different diffraction orders of diffraction grating 108. This optical transmittance depends on the particular diffraction grating profile S(x) and on the refractive index $n_2$ of diffraction grating 108. More specifically, for coarse gratings (where d is much larger than $\gamma$), simplified diffraction theory using the Kirchhoff - Huygens approximation, may be employed to define the diffraction efficiency of the grating as a function of light wavelength for each different superimposed diffraction order contributing to a color stripe. Then by summing the respective diffraction efficiencies of the superimposed diffraction orders forming each color stripe, the color hue of each of the K color stripes can be computed. In this regard, it should be understood that due the angular dispersion in all except the zero diffraction order, the color does vary slightly at the borders of each individual stripe. However, it is the average color over the width W of each single stripe that is computed. Reference is made to my aforesaid U.S. Pat. No. 3,957,354 for a disclosure of how diffraction efficiency, as a function of light wavelength, for various diffraction orders of a diffraction grating, is computed using the Kirchhoff formula equations of simplified diffraction theory.

Each line spacing period of diffraction grating 108 may have any profile shape, which profile shape is described by some certain function S(x). However, there is a class of profiles which is particularly suited to generate good colors, as described in my aforesaid U.S. Pat. No. 3,957,354. These are all step-function profiles, with vertical walls and flat bases all of the same angle with respect to the incident light. One particular example, the square-wave profile shown in FIG. 2, is discussed in detail below. The profiles which are less successful in generating good colors, but which are still contemplated by the present invention, are all continuous profiles, such as for instance a sine-wave profile.

Shown in FIG. 2, is a first preferred embodiment 108a of diffraction grating 108 of FIG. 1. Diffraction grating 108a is a coarse (line spacing d greater or equal to 5 μm) square-wave phase grating composed of a material exhibiting an index of refraction $n_2$ greater than that of its surroundings (which surroundings are normally air having an index of refraction of unity). The square-wave profile is formed of equally spaced projections 200, each having a width v and a depth a'. The aspect ratio b (equal to v/d) of square-wave profile grating 108a is one-half. Therefore, square-wave profile grating 108a has a profile S(x) spatially defined by equations (7).

$$S(x) = \begin{cases} +\frac{a'}{2} & \text{for } \cos(2\pi x/d) < 0 \\ -\frac{a'}{2} & \text{for } \cos(2\pi x/d) > 0 \end{cases} \quad (7)$$

Since square-wave profile grating 108a is a coarse grating ($d \geq 5$ μm), the Kirchhoff formula equations of simplified diffraction theory may be employed to define the respective diffraction efficiencies of the zero diffraction order and one or more higher diffraction orders. If it is assumed that the plural integer K has a value of 2 (so that each repeating group comprises two different color stripes), the respective optical transmittances $t_1$ ($\gamma$) and $t_2$ ($\gamma$) defining each of these two different colors can be shown to be:

$$t_1(\gamma) = \sin^2(\pi(n_2 - 1)a'/\gamma) \quad (8)$$

$$t_2(\gamma) = \cos^2(\pi(n_2 - 1)a'/\gamma) \quad (9)$$

$t_1$ ($\gamma$) and $t_2$ ($\gamma$) represent bright and saturated complementary colors for values of $a'$ ($n_2 - 1$) in the range of 500–1700 nm.

Reference is made to my aforesaid U.S. Pat. No. 4,130,347, which is directed to fine-line diffractive color filters (those having line spacings d of between 0.7 and 2.0 μm). As taught in patent 4,130,347, in order to obtain good colors with a fine-line diffractive filter, rigorous diffraction theory (which takes into account that light is an electromagnetic wave defined by the Maxwell-equations) must be used to define the appropriate values of the depth $a'$ and the aspect ratio b of a rectangular wave profile. More specifically, as shown in FIG. 3, when the line spacing d of diffraction grating 108b is between 0.7 and 2.0 μm, the width v of each projection 300 is made significantly smaller than one-half the line spacing d. Therefore, the aspect ratio b of grating 108b is significantly smaller than one-half. However, as shown in my aforesaid U.S. Pat. No. 4,130,347, there is still strong wavelength dependence of the diffraction efficiency of the various diffraction orders, and, hence, good colors are still obtainable with fine-line rectangular groove gratings, such as grating 108b.

In practice, a typical camera and/or projection system employs an imaging lens having an f-number $F_c$ of three or less. If $\gamma$ is assumed to have a value of approximately 0.5 μm, equation (1) above leads to the condition that $d \leq 1.5$ μm. The value of L is usually chosen to provide the desired resolution. The remaining parameters may be obtained using equation (2), which for a value K of 2, requires an f-number $F_L$ of the lenticular lens of 1.5, and a focal length f for the lenticular lens of approximately 2.3 L (for a typical value of $n_1$ of 1.5).

Several diffractive stripe color filters have been fabricated employing the teachings of the present invention. Good results were obtained with gratings having a line spacing d of 1.4 μm and lenticular arrays having a periodicity L in the range of 30–50 μm. Both the gratings and the lenticular arrays were fabricated by embossing the surface of a polyvinylchloride (PVC) plastic sheet (i.e., $n_1 = n_2 = 1.54$). Thus, a diffractive stripe color filter employing the principles of the present invention can be fabricated at much lower cost than a conventional absorptive-dye color-stripe filter.

Home-type color TV cameras, requiring color-encoding stripe filters, are now being developed which employ a single photosensitive surface of a solid-state CCD (charged-coupled device) array for image pickup, rather than a conventional single-beam vidicon tube. Among other benefits, a CCD color TV camera has the potential of relatively inexpensive fabrication (which is of importance for a home-type color TV camera). Because of its low cost, it is highly desirable to employ the diffractive color filter of the present invention as the color-encoding stripe filter of a home-type color TV camera, such as a CCD color TV camera.

Figure 4B:
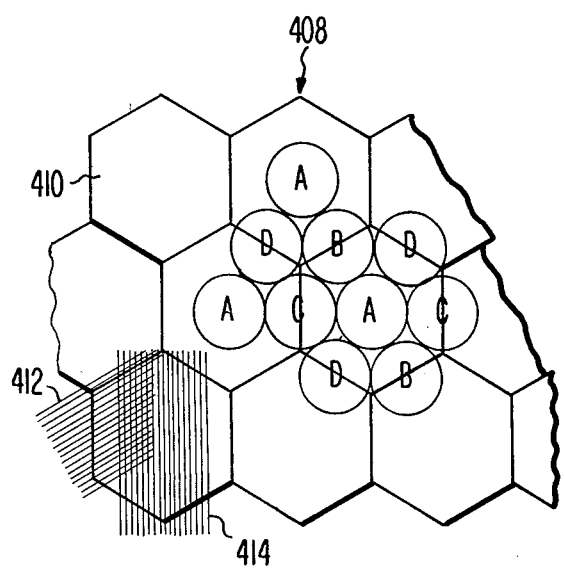

As so far described (in connection with FIGS. 1, 2 and 3), the diffractive color filter is one-dimensional (i.e. employs a single diffraction grating and a cylindrical lenticular lens array). However, the present invention also contemplates two-dimensional diffractive color filters that incorporate two separate angularly displaced diffraction gratings and a two dimensional lenticular array of spherical lenses. FIGS. 4a and 4b schematically illustrate the spatial arrangements of respective first and second embodiments of a two-dimensional diffractive color filter employing the principles of the present invention.

Referring to FIG. 4a, lenticular lens array comprises spherical lenses spatially arranged in rows and columns with a row periodicity of L and a column periodicity of L. More specifically, each individual spherical lens of array 400 is situated within a separate one of square areas, such as square area 402, with the side of each square being L in length. Two-dimensional lenticular array 400 cooperates with a diffractive structure comprising two superimposed diffraction gratings 404 and 406, both of which may have the same line spacing d. As shown in FIG. 4a, the lines of diffraction grating 404 are oriented parallel to the rows of lenticular array 400, while the lines of diffraction grating 406 are oriented parallel to the columns of two-dimensional lenticular array 400. Therefore, respective diffraction gratings 404 and 406 are angularly displaced from each other by 90°.

The letters A, B, C and D in FIG. 4a show the spatial arrangement of spots of different colors generated in the focal plane of two-dimensional lenticular array 400. A represents the color produced at the respective spatial positions of the zero diffraction order of the two gratings, B and C represent the colors produced at the respective spatial positions of the respective first orders of each individual one of the two gratings and D represents the color produced at the respective spatial positions of the mixed first orders of two adjacent gratings.

FIG. 4b illustrates another spatial arrangement of a two-dimensional diffractive color filter. More specifically, in the two-dimensional lenticular array 408 of FIG. 4b, each spherical lens is situated within a separate one of hexagonal areas, such as hexagonal area 410. Since the side of each hexagonal area is L, the periodicity of two-dimensional lenticular array is L. In FIG. 4b, the diffractive structure comprises two superimposed angularly-displaced diffraction gratings 412 and 414. As shown in FIG. 4b, the lines diffraction grating 410 are oriented parallel to one set of sides and the lines of diffraction grating 414 are oriented parallel to another set of sides of the hexagonal areas, such as hexagonal area 410, of two-dimensional lenticular array 408. Thus, lines of diffraction grating 412 are angularly displaced by 120° with respect to the lines of diffraction grating 414. FIG. 4b also shows the respective spatial positions of color spots A, B, C and D (discussed above in connection with FIG. 4a).

For simplicity in describing the two-dimensional diffractive color filters shown in FIGS. 4a and 4b, it has been assumed that K=2 and that d and L are the same in all directions. It should be understood that the present invention contemplates less symmetric two-dimensional patterns which result from a different choice of d, L and K.

Among the advantages of the diffractive color filter of the present invention are (1) it can be mass produced at low cost using embossing or casting techniques; (2) it is very stable and does not bleach with time or use; (3) it is practically 100 percent efficient in its use of light (substantially none of the incident light is absorbed or reflected); (4) it can be produced in a wide range of materials, and (5) it allows a wide range of color patterns to be produced. However, a particularly noteworthy advantage of the present invention is the fact that it works well with an imaging lens having a relatively small f-number $F_c$. A small f-number $F_c$ imaging lens provides more light-gathering power and, hence, faster optics. In this regard, reference is made to my aforesaid U.S. Pat. No. 4,079,411, which discloses a diffractive phase filter having near-field wavelength-dependent focusing properties, that cause it also to operate as a diffraction color filter. However, the diffractive color filter of my aforesaid U.S. Pat. No. 4,079,411 requires that the incident polychromatic light beam be collimated (i.e. the f-number of any imaging lens employed must be at least fifteen). This is about a 5–10 times larger f-number (corresponding to 25–100 times less gathered light) than that needed by the diffractive color filter of the present invention.

What is claimed is:

1. A diffractive color filter for use in a polychromatic-light imaging system including an imaging lens and a photosensitive surface situated in an image plane of said lens, said lens having an f-number $F_c$ equal or greater than a minimum f-number $F_c^{min}$; said filter comprising:
   a lenticular lens array having a lens periodicity L, a focal length f and an effective f-number $F_L$ proportional to f/L, said array being adapted to be situated with its focal plane substantially in coincidence with said photosensitive surface,
   a diffractive structure situated substantially in proximity to said array, said diffractive structure including a phase grating having a predetermined grating profile S(x) and grating line spacing d, where d is larger than a certain wavelength $\gamma$ of said polychromatic light, and
   wherein the following relationship exists:

$$F_c^{min} \geq d/\gamma$$

2. The diffractive subtractive filter defined in claim 1 wherein said lenticular lens array is composed of a material exhibiting an index of refraction $n_1$, said array material extending to said focal plane of said array, thereby to provide an f-number $F_L$ for said array equal to $f/n_1L$,
   wherein said diffractive structure is composed of a material exhibiting an index of refraction $n_2$, and
   wherein the following further relationship exists:

$$F_L = d/K\gamma$$

where K is a particular plural integer.

3. The diffractive color filter defined in claim 2, wherein said grating profile S(x) has a certain rectangular wave form of depth a' and aspect ratio b.

4. The diffractive color filter defined in claim 3, wherein said line spacing d is at least five micrometers and said aspect ratio is substantially one-half, whereby said certain rectangular waveform is a square waveform.

5. The diffractive color filter defined in claim 3, wherein said line spacing d is substantially less than five micrometers and said aspect ratio b is substantially less than one-half.

6. The diffractive color filter defined in claim 5, wherein said aspect ratio b has that value which produces substantially saturated color hues in said focal plane of said array.

7. The diffractive color filter defined in claim 3, wherein d is no greater than 1.5 micrometers, $\gamma$ is approximately 0.5 micrometers, K is equal to two and $n_1$ is about 1.5.

8. The diffractive color filter defined in claim 3, wherein d is substantially 1.4 micrometers, L is in the range of 30–50 micrometers, K is equal to two, both $n_1$ and $n_2$ equal 1.54, and said polychromatic light is white light.

9. The diffractive color filter defined in claim 2, wherein said array is a linear array of cylindrical lenses and wherein said diffractive structure includes a single grating having lines oriented substantially parallel to the axis of said cylindrical lenses, whereby said color filter is a stripe color filter.

10. The diffractive color filter defined in claim 2, wherein said array is a two-dimensional array, and wherein said diffractive structure comprises two angularly-displaced phase gratings.

11. The diffractive color filter defined in claim 10, wherein said two-dimensional array is a rectangular array, and wherein said two angularly-displaced phase gratings are oriented at a substantially ninety degree angle with respect to each other.

12. The diffractive color filter defined in claim 10, wherein said two-dimensional array is a hexagonal array and wherein said two angularly-displaced phase gratings are oriented at a substantially one-hundred-twenty degree angle with respect to each other.

13. The diffractive color filter defined in claim 2, wherein said array and said diffractive structure are comprised of embossed plastic material.

* * * * *

UNITED STATES PATENT AND TRADEMARK OFFICE
CERTIFICATE OF CORRECTION

PATENT NO. : 4,255,019

DATED : March 10, 1981

INVENTOR(S) : Karl Heinrich Knop

It is certified that error appears in the above-identified patent and that said Letters Patent is hereby corrected as shown below:

Column 2, line 14, "$\gamma$" should be ---$\lambda$---

Column 2, equation 1, "$F_c^{min} \geq d/\gamma$" should be ---$F_c^{min} \geq d/\lambda$---

Column 2, equation 2, "$F_L = d/K\gamma$" should be ---$F_L = d/K\lambda$---

Column 2, line 66, "$\gamma$" should be ---$\lambda$---

Column 3, equation 4, "$g = f\gamma/n_1 d$" should be ---$g = f \cdot \lambda/n_1 d$---

Column 4, line 44, "$F_c^{min} \geq d/\gamma$" should be ---$F_c^{min} \geq d/\lambda$---

Column 3, equation 2, "$F_L = d/K\gamma$" should be ---$F_L = d/K\lambda$---

Column 5, line 16, "$(\gamma)$ and $t_2(\gamma)$" should be ---$(\lambda)$ and $t_2(\lambda)$---

Column 5, equation 8, "$t_1(\gamma) = \sin^2(\pi(n_2-1)a'/\gamma)$" should be ---$t_1(\lambda) = \sin^2(\pi(n_2-1)a'/\lambda)$---

Column 5, equation 9, "$t_2(\gamma) = \cos^2(\pi(n_2-1)a'/\gamma)$" should be ---$t_2(\lambda) = \cos^2(\pi(n_2-1)a'/\lambda)$---

Column 5, line 23, "$t_1(\gamma)$ and $t_2(\gamma)$" should be ---$t_1(\lambda)$ and $t_2(\lambda)$---

UNITED STATES PATENT AND TRADEMARK OFFICE
CERTIFICATE OF CORRECTION

PATENT NO. : 4,255,019

DATED : March 10, 1981

INVENTOR(S) : Karl Heinrich Knop

It is certified that error appears in the above-identified patent and that said Letters Patent is hereby corrected as shown below:

Column 5, line 47, "$\gamma$" should be ---$\lambda$---

Column 7, claim 1, line 49, "$\gamma$" should be ---$\lambda$---

Column 7, claim 1, equation, "$F_c^{min} \geq d/\gamma$" should be ---$F_c^{min} \geq d/\lambda$---

Column 8, claim 2, equation "$F_L = d/K\gamma$" should be ---$F_L = d/K\lambda$---

Column 8, claim 7, line 27 "$\gamma$" should be ---$\lambda$---

Signed and Sealed this

Fourth Day of August 1981

[SEAL]

Attest:

GERALD J. MOSSINGHOFF

*Attesting Officer*   *Commissioner of Patents and Trademarks*